Jan. 16, 1940.   W. A. BATES   2,187,529
METHOD OF WELDING GRATINGS
Filed Aug. 24, 1938

Inventor:
Walter A. Bates
By Bell, Wallace & Cannon
Attorneys.

Patented Jan. 16, 1940

2,187,529

UNITED STATES PATENT OFFICE 2,187,529

METHOD OF WELDING GRATINGS

Walter A. Bates, Joliet, Ill., assignor to Beulah H. Bates, Joliet, Ill.

Application August 24, 1938, Serial No. 226,493

6 Claims. (Cl. 219—10)

This invention relates to a method of welding gratings such as are used for flooring, stair treads and for many other like purposes.

A principal object is to provide a strong and rigid grating constructed so as to present a substantially non-skid surface thereon.

Another object is to provide a strong grating from conventionally shaped longitudinal and transverse members fused or welded together in a novel, simple and economical manner.

A further object is to provide a strong, substantial, and thoroughly welded joint between the longitudinal and transverse members.

A still further object is to provide a simple and efficient method of securing longitudinal and transverse bars of conventional shape together in a single operation to form a strong and substantial joint therebetween to produce a strong and rigid grating.

In the accompanying drawing illustrating a selected embodiment of the invention

The grating of this invention is composed of main longitudinal bars 7 spaced in parallel relation a distance suitable for the purpose for which the grating is intended to be used. A plurality of spaced parallel transverse bars 8 of a generally hexagonal cross-section are welded to the tops of the main bars by means of electrical pressure welding.

Figure 1:
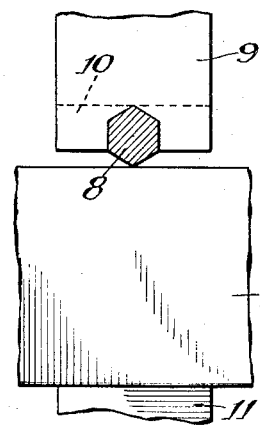
Fig. 1 is a diagrammatic view showing a transverse bar in section and illustrating the initial position in the welding operation.
Figure 2:
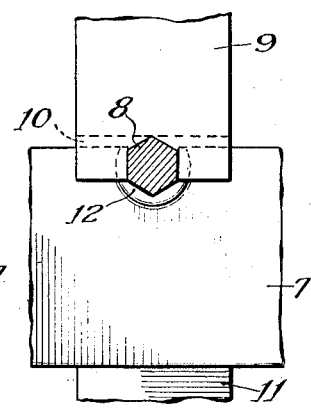
Fig. 2 is a similar view showing the concluding position in the welding operation.
Figure 3:
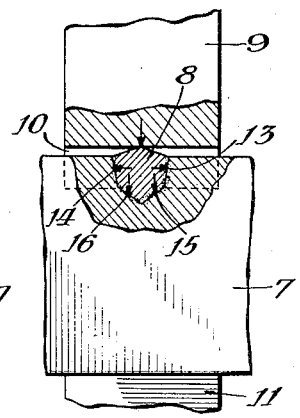
Fig. 3 is a sectional view taken through the weld illustrating the welded joint diagrammatically. It is to be understood that actual cutting through the joint discloses no visible joint line as is illustrated but a completely unitary appearance is presented.
Figure 4:
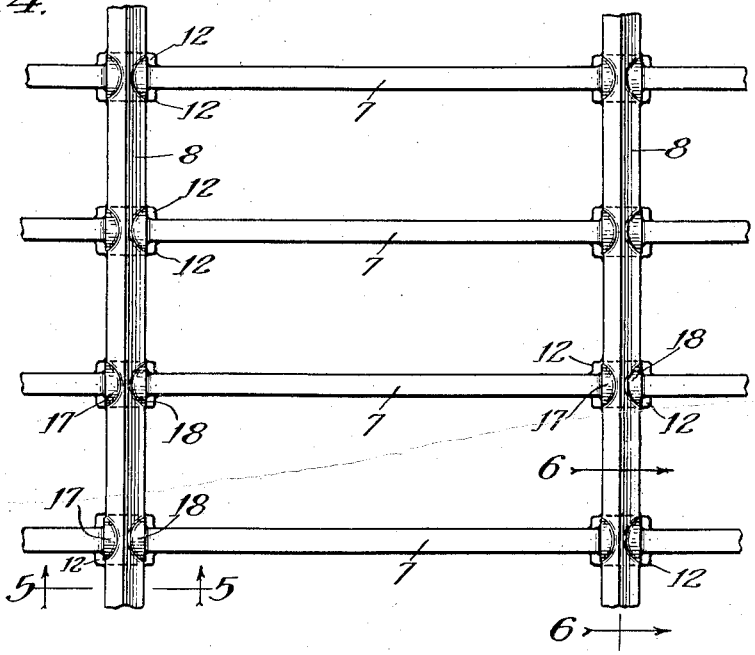
Fig. 4 is a plan view of a portion of grating embodying my invention.
Figure 5:
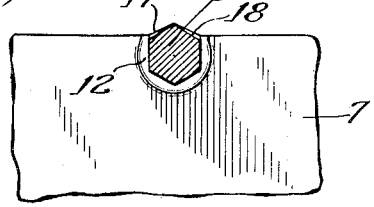
Fig. 5 is a sectional view taken on the line 5—5 of Fig. 4.
Figure 6:
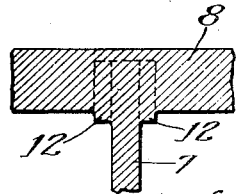
Fig. 6 is a sectional view taken on the line 6—6 of Fig. 4.

In the manufacture of the grating the main bars are arranged in their desired positions and the transverse bars are arranged across the tops of the main bars with a corner formed by a pair of intersecting surfaces thereon engaging the tops of the main bars as shown in Fig. 1. The top die 9 of the electrical pressure welding machine is so constructed that the operating face of the die has an opening therein conforming to the shape of four sides of the hexagonal bar to hold the bar in position so that the corner between the other two surfaces will engage the tops of the main bars. The top die is recessed at 10 to accommodate the top of the main bars. The bottom die 11 has a flat surface presented to the bottom of the main bars. It has been the practice in electrical pressure welding to accomplish the welding in as short a time as possible. However, applicant has found that a slight delay in the welding produces a much more satisfactory joint for the bars of a grating. As the electricity is passed through the transverse bar 8, when in the position shown in Fig. 1, a relatively high heat is produced at the point of contact between the bars rendering the main bar semi-molten at the point of contact and the pressure exerted on the top die pushes the hexagonal bar into the molten mass of the main bar displacing the metal of the main bar so that a flange 12 is formed on both sides thereof. The flange becomes integral with the transverse bar due to the welding action and of course remains integral with the main bar. It is obvious therefore that a strong and substantial joint is obtained. The hexagonal bar is likewise hot at its point of contact with the main bar and, due to the heavy pressure exerted by the upper die 9, is somewhat deformed when pressed into the main bar. The arrows shown in Fig. 3 illustrate the direction of force of the upper die 9 and the dissipation of the force in the transverse bar 8. In Fig. 3 there is illustrated the deformation of the hexagonal bar at the welded joint. It is to be understood that no sharp line of separation between the main bar and the hexagonal bar can be seen upon cutting through the joint but such line is shown in Fig. 3 for the purpose of better illustrating the deformation of the transverse bar. It will be noted that four sides of the hexagonal bar are welded to the main bar whereas, if there were not this deformation, the sides 13 and 14 of the hexagonal bar would be vertical, the hexagonal bar having been pushed into the main bar without deformation, and there would be merely contact between the two bars at the sides 13 and 14 without there being a true weld and in such an event the only weld would be at the sides 15 and 16. By providing for this deformation the force exerted by the upper die is transmitted to the sides 13 and 14 as well as to the sides 15 and 16, producing a strong and substantial weld at all of these sides. Furthermore, the production of the flanges 12 provides a greater amount of metal of the main bar contacting, engaging, and welded to the transverse bars. In producing the type of weld which I have illustrated, some of the metal at the weld builds up at 17 and 18 on top of the hexagonal bars and therefore there is an absence of any depression at the joint in which dirt, grease and the like may collect and build up, forming a slippery spot on the weld. The grating is therefore self-cleansing in that dirt and foreign matter falling on the grating will slide off of the inclined top surfaces of the hexagonal bars and the built-up portions 17 and 18, keeping the grating relatively clean at all times.

A round bar cannot produce a welded structure such as is illustrated in applicant's drawing for the weld would only occur over the extent of one hundred eighty degrees at the bottom of the round bar, there being no pressure exerted on the upper one hundred eighty degrees of the round bar. A square bar would be pushed straight into the main bar with there being welding contact on the bottom surface, the two vertical surfaces being merely contact without weld. An octagonal bar would have the same effect as a round bar, there being only the bottom four surfaces in welding contact with the main bar. A triangular bar, wherein a base of the triangle is arranged in contact with the main bar, would have only one-third of its surface in welding contact therewith. If the triangular bar were originally placed with an apex in contact with the main bar, two-thirds of the bar would be in welding contact. However, the top surface would be flush with the top surface of the main bars. This would not produce a non-skid surface. Such would be the case also if a round, square or octagonal bar were used. It is important in grating that the surface presented to the sole of the shoe be relatively sharp to prevent skidding or slipping thereon and the use of a hexagonal bar such as applicant uses is the only satisfactory method of providing a non-skid surface with a strong and substantial weld at the joints between the main and transverse bars.

My grating provides a strong and substantial structure quickly and easily made and which when completed has a non-skid surface at the tread thereof and which is of great utility and made of standard and commercially procurable bars in conventional shapes and which has a joint between the longitudinal and transverse bars which is securely welded throughout a major portion of the surfaces of the transverse bars at the points of intersection with the longitudinal bars. While I have shown the invention in the selected embodiment which I consider desirable for commercial use I do not thereby intend to restrict the invention specifically thereto and reserve the right to make any change in the form, construction and arrangement of parts as may be necessary or desirable to satisfy different conditions within the scope of the following claims.

I claim:

1. The method of making a metallic grating consisting of arranging a plurality of longitudinal main bars in spaced parallel relation with the tops of all of the main bars in a single plane, arranging a plurality of transverse bars of a regular hexagonal cross-section throughout their length transversely of said main bars with a corner thereof in engagement with the tops of said main bars, passing an electric welding current through the transverse bars and the longitudinal bars at their points of intersection and applying pressure at said intersections sufficient to slightly distort the cross-sectional hexagonal shape of said transverse bars so that when the bars become semi-molten the hexagonal bars acquire the cross-sectional shape of an irregular hexagon wherein the angles at the tops of the sides are equal to each other but of less degree than the angles at the bottoms of the sides which also are equal to each other thus effecting a secure weld at the four lowermost surfaces of the hexagonal transverse bars.

2. The method of making a metallic grating consisting of arranging a plurality of longitudinal main bars in spaced parallel relation with the tops of all of the main bars in a single plane, arranging a plurality of transverse bars of a regular hexagonal cross-section throughout their length transversely of the main bars with a corner thereof in engagement with the tops of said main bars, passing an electrical welding current through the bars at the intersections to soften the bars at the intersections, applying pressure sufficient to slightly distort the hexagonal bars at the points of intersection to throw the parallel side walls thereof out of parallel so that the planes thereof intersect below the hexagonal bars, and forcing the hexagonal bars downwardly whereby a part of the downward pressure is distributed to the out of parallel side walls, thus embedding a substantial portion of the transverse bars in the main bars and effecting a secure weld between said side walls and the main bars.

3. The method of making a metallic grating consisting of arranging a plurality of longitudinal main bars in spaced parallel relation with the tops of all of the main bars in a single plane, arranging a plurality of transverse bars of a regular hexagonal cross-section throughout their length transversely of the main bars with a corner thereof in engagement with the tops of said main bars, passing an electrical welding current through the bars at the intersections to soften the bars at the intersections, applying pressure sufficient to slightly distort the hexagonal bars at the points of intersection to throw the parallel side walls thereof out of parallel so that the planes thereof intersect below the hexagonal bars, and simultaneously forcing the hexagonal bars downwardly until the side walls thereof are below the plane of the tops of the main bars whereby a part of the downward pressure is distributed to the out of parallel side walls and the remainder of the downward pressure is distributed to the bottom walls of each hexagonal bar, thus embedding a substantial portion of the hexagonal bar in the main bar and effecting a secure weld between said side walls and bottom walls and the main bars.

4. The method of assembling metallic bars consisting of intersecting and contacting a longitudinal main bar and a transverse bar of regular hexagonal cross-section with a corner thereof in engagement with the top of the main bar, passing an electrical welding current through and applying pressure to the bars at the intersection to soften the bars thereat and to slightly distort the hexagonal bars at the point of intersection to throw the parallel side walls thereof out of parallel so that the planes thereof intersect below the hexagonal bar, and to distribute a part of the said pressure to the out of parallel side walls, thus embedding a substantial portion of the transverse bar in the main bar and effecting a secure weld between said side walls and the main bar.

5. The method of assembling metallic bars consisting of intersecting and contacting a longitudinal main bar and a transverse bar of regular hexagonal cross-section with a corner of the main bar, passing an electric welding current through the main and transverse bars at their point of intersection and applying pressure at said intersection sufficient to slightly distort the cross-sectional hexagonal shape of the transverse bar so that when the bars become semi-molten the hexagonal bar acquires the cross-sectional shape of an irregular hexagon wherein the angles at the top of the sides are equal to each other but of less degree than the angles at the bottom of the sides which also are equal to each other thus effecting a secure weld at the four lowermost surfaces of the hexagonal bars.

6. The method of making a metallic grating consisting of arranging a plurality of longitudinal main bars in spaced parallel relation, arranging a plurality of transverse bars of a regular hexagonal cross-section throughout their length transversely of the main bars with a corner thereof in engagement with the tops of said main bars, passing an electrical welding current through and applying pressure to the bars at the intersections to soften the bars thereat and to slightly distort the hexagonal bars at the points of intersection to throw the parallel side walls thereof out of parallel so that the planes thereof intersect below the hexagonal bars, and to distribute a part of the said pressure to the out of parallel side walls, thus embedding a substantial portion of the transverse bars in the main bars and effecting a secure weld between said side walls and the main bar.

WALTER A. BATES.